United States Patent [19]

Levitt et al.

[11] Patent Number: 4,816,682
[45] Date of Patent: Mar. 28, 1989

[54] DETECTION OF NUCLEAR RADIATION

[76] Inventors: Charlie M. Levitt, 40 Craighall Road, Victory Park, Johannesburg, Transvaal; Henry B. Dyer, 28 George Street, Bryanston, Transvaal, both of South Africa

[21] Appl. No.: 133,954

[22] Filed: Dec. 17, 1987

[30] Foreign Application Priority Data

Dec. 18, 1986 [ZA] South Africa .................. 86/9504

[51] Int. Cl.$^4$ .................. G01T 1/115; G01T 1/11
[52] U.S. Cl. .................. 250/337; 250/484.1; 406/88
[58] Field of Search ......... 250/337, 484.1 R, 484.1 A, 250/491.1; 406/86, 87, 88; 356/244

[56] References Cited

U.S. PATENT DOCUMENTS

| 3,590,245 | 6/1971 | Oonishi et al. | 250/484.1 |
| 4,186,838 | 2/1980 | Levitt et al. | 356/435 |
| 4,444,531 | 4/1984 | Baker et al. | 406/88 |
| 4,690,591 | 9/1987 | Nagashima et al. | 406/88 |
| 4,738,748 | 4/1988 | Kisa | 406/88 |

FOREIGN PATENT DOCUMENTS

| 0022981 | 2/1977 | Japan | 250/337 |
| 0063077 | 6/1978 | Japan | 250/337 |
| 0156691 | 12/1979 | Japan | 250/337 |

Primary Examiner—Janice A. Howell
Assistant Examiner—William F. Rauchholz
Attorney, Agent, or Firm—Scully, Scott, Murphy & Presser

[57] ABSTRACT

A method of determining the nuclear radiation dosage to which a thermoluminescent crystal, such as a diamond or cubic boron nitride crystal, has previously been subjected, involves the steps of heating the cyrstal up while supporting it against gravity on an upwardly flowing stream of gas. The light which the crystal emits is collected and analyzed to give a radiation dosage measure in accordance with a know relationship between amount of collected light and radiation dosage. The gas stream may be a hot gas stream in which case the hot gas also serves to heat up the crystal. In one embodiment of the invention, the crystal is supported and heated up inside an integrating sphere which collects the emitted light.

21 Claims, 2 Drawing Sheets

DETECTION OF NUCLEAR RADIATION

BACKGROUND TO THE INVENTION

This invention relates to the detection of nuclear radiation and to the determination of nuclear radiation dosages.

So-called thermoluminescent materials are known. A particularly well-known thermoluminescent material is lithium fluoride. Also, as described in South African patent application No. 86/1988, industrial diamonds are also known to have the characteristics of thermoluminescent materials. Another known thermoluminescent material is cubic boron nitride (CBN).

When a crystalline thermoluminescent material is subjected to nuclear radiation (such as radiation by X-rays, alpha particles, neutrons, protons, gamma rays or electrons) while at an appropriately low temperature, free electrons or holes become trapped at lattice imperfections in the crystal and can remain so trapped for a considerable period of time if their temperature is maintained at a sufficiently low value. However, when the temperature is increased, the electrons or holes return to stable energy stages, often with the emission of light.

This phenomenon has been used to determine nuclear radiation dosages in medical physics. For instance, a person who is subjected to nuclear radiation, such as X-rays, is fitted with a thermoluminescent crystal in which the above-described change in electron energy level takes place during exposure to the radiation. The crystal is then removed from the person of the wearer and is subjected to testing to obtain a measure of the dosage of radiation to which the crystal and hence the person has been subjected. The conventional testing technique involves placing the irradiated crystal on a support surface which is heated from below using a resistance heater. The light emitted by the crystal upon being heated is collected by a photomultiplier (PM) tube. The amount of light which is collected by the PM tube is then used to give a determination of the original nuclear radiation dosage in terms of a known relationship between light collected and radiation dosage.

While the principles of the technique are sound, great difficulty has been encountered in getting repeatability of results. The main cause for this variation in results is the requirement that the crystal be extremely accurately and uniformly positioned on its support. Failure to locate crystals in exactly the same way each time results in non-uniform results because of different heat intensities applied to the crystal and to non-uniform light collection by the PM tube. Furthermore, the crystal is heated from one side only and this contributes to non-uniformity during the heating process. Also, much of the light which the crystal emits is scattered and is not collected at all by the PM tube.

Other problems are that the emitted light, especially in the case of a thermoluminescent diamond, is of low intensity which again means that the diamond must be extremely accurately positioned in relation to the PM tube. Also, the conventionally used resistance heaters may take as long as 20 to 30 seconds to heat up a diamond to the required temperature.

It is believed that thermoluminescent diamonds could be used to good effect in medical physics to determine radiation dosage. The main reason is that diamond, being carbon, has a composition corresponding closely to that of the human body. This means that the radiation absorbed by a diamond will approximate to that absorbed by the human body and hence that diamond will give a reliable indication of dosage to which a human body has been exposed.

The present invention seeks to provide an alternative method and means for determining nuclear radiation dosages using thermoluminescent crystals.

SUMMARY OF THE INVENTION

One aspect of the invention provides a method of determining the dosage of nuclear radiation to which a thermoluminescent crystal has previously been subjected, the method comprising the steps of heating up the crystal to a temperature appropriate for luminescence thereof to take place, collecting the light emitted by the crystal and computing the radiation dosage therefrom, wherein a stream of upwardly flowing gas is used to support the crystal against gravity while it is heated up.

Another aspect of the invention provides an apparatus for determining the dosage of nuclear radiation to which a thermoluminescent crystal has previously been subjected, the apparatus comprising means for heating up the crystal to a temperature appropriate for luminescence to take place, means for collecting the light emitted by the crystal and means for computing the radiation dosage therefrom, wherein the apparatus also comprises means for establishing an upwardly flowing stream of gas for supporting the crystal against gravity while it is heated up.

The crystal may be supported and heated up by a stream of hot gas. However, the crystal may initially be supported by a stream of cold gas which is subsequently replaced by the hot gas stream.

Preferably an integrating sphere is used to collect the light emitted by the crystal, the crystal being supported and heated up inside the integrating sphere. The integrating sphere may, for instance, have a vertical, light-transmitting tube extending therethrough. The gas stream is arranged to flow upwardly in the tube while the crystal is dropped into the tube.

The invention may be used to determine dosages from remote radiation sources. Alternatively it may be used periodically to determine dosages from a single source. In this case, the crystal may be dropped to the lower end of the tube for each irradiation cycle and thereafter be elevated on the gas stream into the integrating sphere for a dosage determination to take place.

In one version of the invention, the crystal is encapsulated alone or with other similar crystals in the light-transmitting body, typically one made of glass.

BRIEF DESCRIPTION OF THE DRAWING

The invention will now be described in more detail, by way of example only, with reference to the accompanying drawings, wherein.

DESCRIPTION OF EMBODIMENTS

Figure 1:
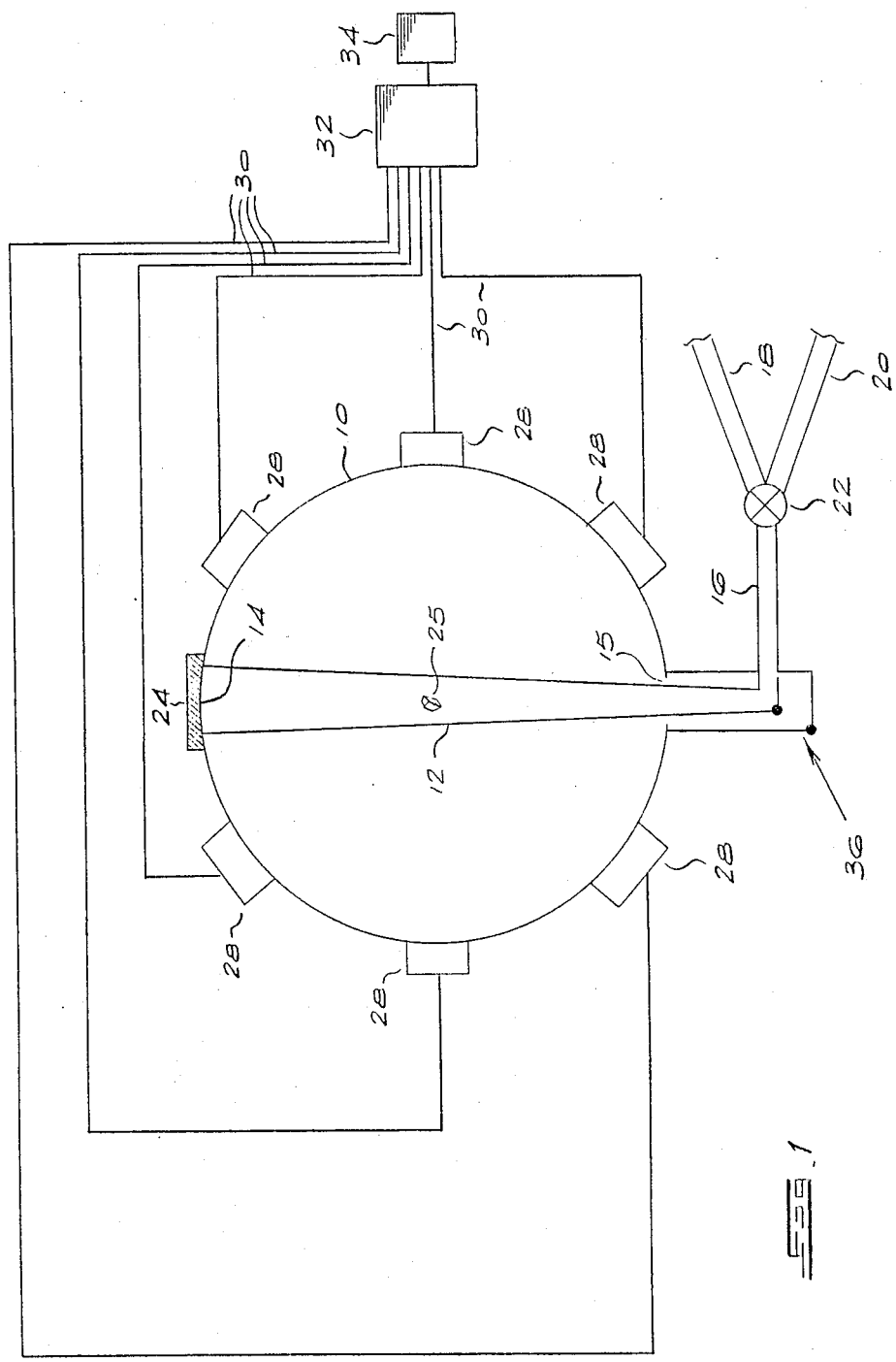
FIG. 1 shows a schematic view of the apparatus according to the invention.

In FIG. 1, an integrating sphere is designated with the reference numeral 10. The internal surface of the sphere is coated with a barium sulphate photometric paint of neutral spectral reflectance. A tapering, clear glass tube 12 extends diametrically through the sphere 10 from an opening 14 at the to to an opening 15 at the bottom thereof.

A tube 16 extends from the bottom end of the tube 12. Branch tubes 18 and 20 are connected to the tube 16 via a three-way valve 22. At the upper end of the tube 12 i.e. at the opening 14, there is a light impervious baffle 24 which does not permit light to enter or escape from the tube or from the integrating sphere, but which does permit air flow therethrough. There is the facility for raising the baffle and dropping a crystal 25 into the tube 12.

Six PM tubes 28 are arranged about the periphery of the integrating sphere, signals from these tubes being fed via cables 30 to a processing unit 32 which in turns drives a visual display 34. The PM tubes 28 may be selected to be responsive to light of different wavelengths.

At the bottom end of the tube 12, there is a hatch 36 through which a crystal can be withdrawn once it has been tested.

The branch 20 is connected to a source of compressed, cold air while the branch 18 is connected to a source of compressed, hot air.

In use of the apparatus, the valve 22 is manipulated to establish an upwardly flowing stream of cold air in the tube 12. A thermoluminescent crystal 25, typically an appropriate diamond crystal or crystal of cubic boron nitride, which has previously been subjected to nuclear radiation, is dropped into the tube and the baffle is restored to its position in which it prevents light from entering or escaping from the integrating sphere and in which it permits the stream of cold air to escape from the tube. The upwardly flowing air stream is controlled to be such that an equilibrium situation is reached where the crystal is supported by the cold air stream against gravity at the center of the integrating sphere inside the tube. Once the crystal has attained this condition, the valve 22 is manipulated to terminate the cold air inflow and to replace it by an equivalent stream of hot air which maintains the suspended position of the crystal at the center of the integrating sphere.

The hot air not only serves to support the crystal, but also to heat it up rapidly. Typically, the crystal will be in the form of a cube and the effect of the air stream will be to cause it to tumble about and change its orientation while still holding its position at the center of the sphere. Thus the crystal will be heated up uniformly since the hot air stream will impinge on all faces of the crystal. The crystal will generally be heated up to a temperature not exceeding 500° C.

Light will be emitted when the crystal is heated up. This light is collected by the PM tubes situated about the integrating sphere and appropriate signals indicative of the amount of light collected are transmitted to the processing unit 32 where the collected light signals are integrated and analyzed.

The processing unit, having integrated the collected light signals, computes a radiation dosage value in terms of a known relationship between light collected and radiation dosage, and this value is displayed visually on the display 34.

Besides providing the facility for uniform heating of the thermoluminescent crystal, the described apparatus has the advantage that all light which is emitted is collected by the PM tubes i.e. emitted light which is not initially collected by one of the PM tubes is reflected about the interior of the integrating sphere until it is eventually collected. Accordingly, it is believed that the described apparatus will lead to accurate and repeatable results.

Once a particular crystal has been tested in the manner described above, the hot air stream is terminated and the crystal is permitted to fall under gravity to the hatch 36 through which it can be removed in preparation for the testing of another crystal.

It is believed that the apparatus described above will be eminently suitable for use in a medical physics application where it is desirable to detect the radiation dosage to which a person, such as a radiographer or patient undergoing radiation therapy, has been subjected. It is proposed to fix a thermoluminescent diamond crystal to the body of the person during times of exposure to radiation, the diamond subsequently being tested in the manner described above to give an indication of the radiation dosage.

As explained previously, diamond is particularly preferred in this sort of application because of the similarity of its composition with that of the human body.

Another advantage of using diamond is that for diamond, the emitted light intensity increases towards the red end of the spectrum. Thus, PM tubes can be chosen which are responsive at the red end of the spectrum. This eliminates the need for the use of a variety of PM tubes which are responsive to different wavelengths.

In a slightly modified system, a number of diamond or cubic boron nitride crystals are encapsulated in a light-transmitting body, such as a glass ball which is dropped into the tube 12 in the manner described above.

It will be appreciated that the system described above is suitably for determining radiation dosage to which the crystal has been subjected at a remote site. it is also possible to modify the apparatus slightly so as to provide peridic, pseudo-continuous readings of radiation dosage from a single radiation source. In this case, the crystal or light-transmitting body encapsulating the crystals is held stationary at the lower end of the tube 12 where it is irradiated by the source. This can be achieved by allowing the crystal or body to rest on a perforated support (not shown) spanning across the lower end of the tube 12 above the hatch 36.

When it is desired to take a reading, the cold air stream is established to raise the crystal or body to the center of the integrating sphere and to balance it there. The hot air stream is then introduced in the manner described previously and the emitted light is collected. Once the reading has been taken, the control valve 22 is manipulated to reduce or terminate the flow of air to permit the crystal or body to drop under gravity to the lower end of the tube 12 again. Once cooled, the crystal or body can again be subjected to irradiation from the same source before a further reading is taken. Cooling means (not shown) can be provided to cool the crystal or body down each time the process is repeated. This apparatus permits radiation from a fixed source to be monitored repeatedly.

It should also be noted that, an alternative to using a cold air stream and then a hot air stream, a hot air stream alone can be used to support the crystal at the center of the integrating sphere and to heat it up. In this case, there would be no need for a complicated valving system in the associated pipework.

The illustrated embodiment makes use of a total of six PM tubes, but it should be noted that less PM tubes, and possibly only one, can be used. With appropriate filters on the PM tubes, a greater number is preferred for research purposes since not only can a signal be obtained for the total light collected, but also for light of different wavelengths.

Irrespective of the number of PM tubes used in the apparatus, it will be necessary to calibrate the tube(s) correctly at the commencement of testing. This can be done by introducing light of known intensity into the integrating sphere using an optical fiber and then calibrating the PM tube(s) to give the appropriate reading for the known intensity.

EXAMPLE

In a practical example using apparatus similar to that illustrated in the drawing, a 3 mm thermoluminescent diamond was subjected to radiation for a period of 1 minute. During this irradiation, the crystal gave off some light which died away approximately 1 minute after the irradiation ceased. An upward flow of hot air was established in the apparatus and was adjusted to a level suitable for supporting the crystal at the center of the integrating sphere. The diamond was dropped into the tube through which the hot air was flowing and reach an equilibrium position in which it was supported against gravity at the center of the sphere.

Figure 2:
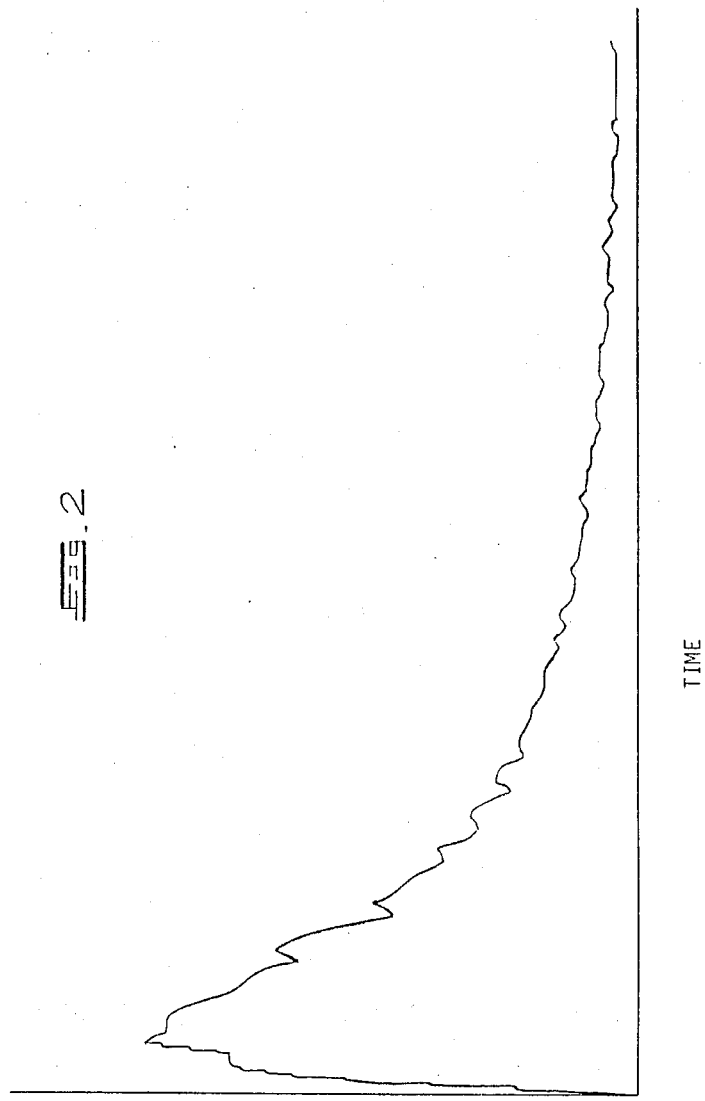
FIG. 2 shows a typical output curve of the processing unit versus time.

A single PM tube was arranged to collect the light reflected about the interior of the integrating sphere. Once the diamond crystal had stabilized, the PM tube was switched on and its output signal fed to an analog to digital converter which in turn fed the digital signal to the processing unit where a computation was made of the radiation dosage. FIG. 2 shows a graph of the amplitude (in arbitrary units) of the PM tube signal against time, the area below the curve representing the light collected. The radiation dosage was computed from this value in terms of a known relationship between dosage and collected light.

We claim:

1. A method of determining the dosage of nuclear radiation to which a thermoluminescent crystal has previously been subjected, the method comprising the steps of heating up the crystal to a temperature appropriate for luminescence thereof to take place, collecting the light emitted by the crystal and computing the radiation dosage therefrom, wherein a stream of upwardly flowing gas is used to support the crystal agianst gravity while it is heated up.

2. The method of claim 1 comprising the step of supporting the crystal on an upwardly flowing stream of hot gas which heats the crystal up.

3. The method of claim 2 comprising the step of supporting the crystal inside an integrating sphere which is used to collect the light emitted by the crystal.

4. The method of claim 3 comprising the steps of initially supporting the crystal in the integrating sphere by means of an upwardly flowing stream of cold gas and thereafter of replacing the stream of cold gas with a stream of hot gas.

5. The method of claim 3 comprising the steps of dropping the crystal into the upper end of a light-transmitting tube extending vertically through the integrating sphere and of directing a stream of gas into the lower end of the tube so as to flow upwardly in the tube and support the crystal at or near the center of the integrating sphere.

6. The method of claim 5 comprising the further step, after the emitted light has been collected, of reducing or terminating the stream of gas flowing in the tube so that the crystal falls to the lower end of the tube.

7. The method of claim 6 comprising the further steps of holding the crystal at the lower end of the tube in a position in which it is irradiated with nuclear radiation again, and of re-establishing the former gas stream to elevate the crystal in the tube for a further determination of radiation dosage.

8. The method of claim 7 wherein the steps of the method are repeated periodically for periodic determination of radiation dosages from a single source.

9. The method of claim 1 wherein the gas stream is an air stream.

10. The method of claim 1 wherein the crystal is encapsulated alone or with other similar crystals in a body of light-transmitting material.

11. The method of claim 1 wherein the crystal is a diamond or cubic boron nitride crystal.

12. An apparatus for determining the dosage of nuclear radiation to which a thermoluminescent crystal has previously been subjected, the apparatus comprising means for heating up the crystal to a temperature appropriate for luminescence to take place, means for collecting the light emitted by the crystal and means for computing the radiation dosage therefrom, wherein the apparatus also comprises means for establishing an upwardly flowing stream of gas for supporting the crystal against gravity while it is heated up.

13. The apparatus of claim 12 comprising means for establishing an upwardly flowing stream of hot gas which supports the crystal against gravity and which also heats the crystal up to the approprite temperature.

14. The apparatus of claim 13 comprising means serving initially to establish an upwardly flowing stream of cold gas for supporting the crystal against gravity and thereafter for replacing the cold gas stream with a hot gas stream.

15. The apparatus of claim 13 wherein the means for collecting the emitted light is an integrating sphere in which the crystal is supported.

16. The apparatus of claim 15 comprising a light-transmitting tube extending vertically through the integrating sphere, the tube having an opening at its upper end through which the crystal can be dropped, and a source of compressed, hot gas connectable to the lower end of the tube.

17. The apparatus of claim 16 comprising a source of compressed cold gas which is also connectable to the lower end of the tube, and valve means operable selectively to connect the cold gas source or the hot gas source to the tube.

18. The apparatus of claim 16 wherein a closure is provided for the upper end of the tube, the closure being impervious to light but previous to gas flow.

19. The apparatus of claim 12 comprising a crystal encapsulated alone or with other similar crystals in a light-transmitting body.

20. The apparatus of claim 19 wherein the or each crystal is a diamond or cubic boron nitride crystal.

21. The apparatus of claim 19 wherein the light-transmitting body is made of glass.

* * * * *